US012468259B2

(12) United States Patent
Sawada

(10) Patent No.: US 12,468,259 B2
(45) Date of Patent: Nov. 11, 2025

(54) BALANCE, TIMEPIECE, AND METHOD FOR MANUFACTURING BALANCE

(71) Applicant: SEIKO EPSON CORPORATION, Tokyo (JP)

(72) Inventor: Akihiro Sawada, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 337 days.

(21) Appl. No.: 18/124,614

(22) Filed: Mar. 22, 2023

(65) Prior Publication Data

US 2023/0305494 A1 Sep. 28, 2023

(30) Foreign Application Priority Data

Mar. 23, 2022 (JP) ................................ 2022-046487

(51) Int. Cl.
*G04B 17/06* (2006.01)

(52) U.S. Cl.
CPC ......... *G04B 17/063* (2013.01); *G04B 17/066* (2013.01)

(58) Field of Classification Search
CPC ... G04B 17/063; G04B 17/066; G04B 17/345
USPC .......................................................... 368/177
See application file for complete search history.

(56) References Cited

U.S. PATENT DOCUMENTS

2006/0055097 A1 3/2006 Conus et al.
2010/0149927 A1* 6/2010 Zaugg .................. G04D 3/0041 368/177
2017/0351216 A1* 12/2017 Balague ................. G04B 17/34

FOREIGN PATENT DOCUMENTS

EP 2916177 A1 * 9/2015 .......... A61M 25/104
EP 3913441 A1 * 11/2021 ........... G04B 17/063
FR 2992744 A1 * 1/2014 ........... G04B 17/066
FR 3036813 A1 * 12/2016 ................ B21F 3/08
JP 2010-139505 A 6/2010
JP 2013-015534 A 1/2013
WO WO-2014072781 A2 * 5/2014 ........... G04B 17/066
WO WO-2015090815 A2 * 6/2015 ............. G04B 17/32

* cited by examiner

*Primary Examiner* — Edwin A. Leon
*Assistant Examiner* — Kevin Andrew Johnston
(74) *Attorney, Agent, or Firm* — Harness, Dickey & Pierce, P.L.C.

(57) ABSTRACT

A balance includes a balance staff rotatably supported by a main plate, a collet fixed to the balance staff, and a hairspring fixed to the collet, the hairspring including a Grossmann curve disposed at a side of the collet and an Archimedes curve coupled to the Grossmann curve, and an impact-resistant member configured to suppress displacement of a shape of the Grossmann curve at least at the side of the collet.

12 Claims, 11 Drawing Sheets

BALANCE, TIMEPIECE, AND METHOD FOR MANUFACTURING BALANCE

The present application is based on, and claims priority from JP Application Serial Number 2022-046487, filed Mar. 23, 2022, the disclosure of which is hereby incorporated by reference herein in its entirety.

BACKGROUND

1. Technical Field

The present disclosure relates to a balance, a timepiece and a method for manufacturing a balance.

2. Related Art

JP-A-2013-15534 and JP-A-2010-139505 disclose a hairspring made of a silicon-based material for speed governing of a balance, and an inner curved portion of the hairspring has a Grossmann type shape and an outer curved portion of the hairspring has an Archimedes type shape. The hairspring is fixed at an end portion of the inner curved portion.

However, in the techniques described in JP-A-2013-15534 and JP-A-2010-139505, when an impact is applied to the timepiece, the inner curved portion of the Grossmann type whose end portion is fixed may be deformed or broken, and thus, there is a problem that accuracy in speed governing of the balance is deteriorated. On the other hand, even when the inner curved portion of the Grossmann type is formed of a metal material, there is a problem that the accuracy in the speed governing of the balance, in other words, the accuracy of the timepiece is adversely affected, including deformation due to impact.

SUMMARY

A balance includes a balance staff rotatably supported by a supporting member, a collet fixed to the balance staff, a hairspring fixed to the collet, the hairspring including a Grossmann curve disposed at a side of the collet and an Archimedes curve coupled to the Grossmann curve, and an impact-resistant member configured to suppress displacement of a shape of the Grossmann curve at least at the side of the collet.

A timepiece includes the balance described above.

A method for manufacturing a balance is a method for manufacturing a balance, the balance including a balance staff rotatably supported by a supporting member and a collet fixed to the balance staff, the method including preparing a hairspring along an Archimedes curve, fixing an inner end portion of the hairspring to the collet, shaping an inner end section of the hairspring into a Grossmann curve by using a shaping member, and removing the shaping member from the collet.

A method for manufacturing a balance is a method for manufacturing a balance, the balance including a balance staff rotatably supported by a supporting member and a collet fixed to the balance staff, the method including preparing a hairspring along an Archimedes curve, fixing an inner end portion of the hairspring to the collet, attaching an impact-resistant member to the collet, and shaping an inner end section of the hairspring into a Grossmann curve by using the impact-resistant member.

A method for manufacturing a balance is a method for manufacturing a balance, the balance including a balance staff rotatably supported by a supporting member and a collet fixed to the balance staff, the method including preparing a hairspring along an Archimedes curve, fixing an inner end portion of the hairspring to the collet, and shaping an inner end section of the hairspring into a Grossmann curve by using the collet.

DESCRIPTION OF EXEMPLARY EMBODIMENTS

First, a configuration of a timepiece 1 will be described with reference to FIG. 1.

Figure 1:
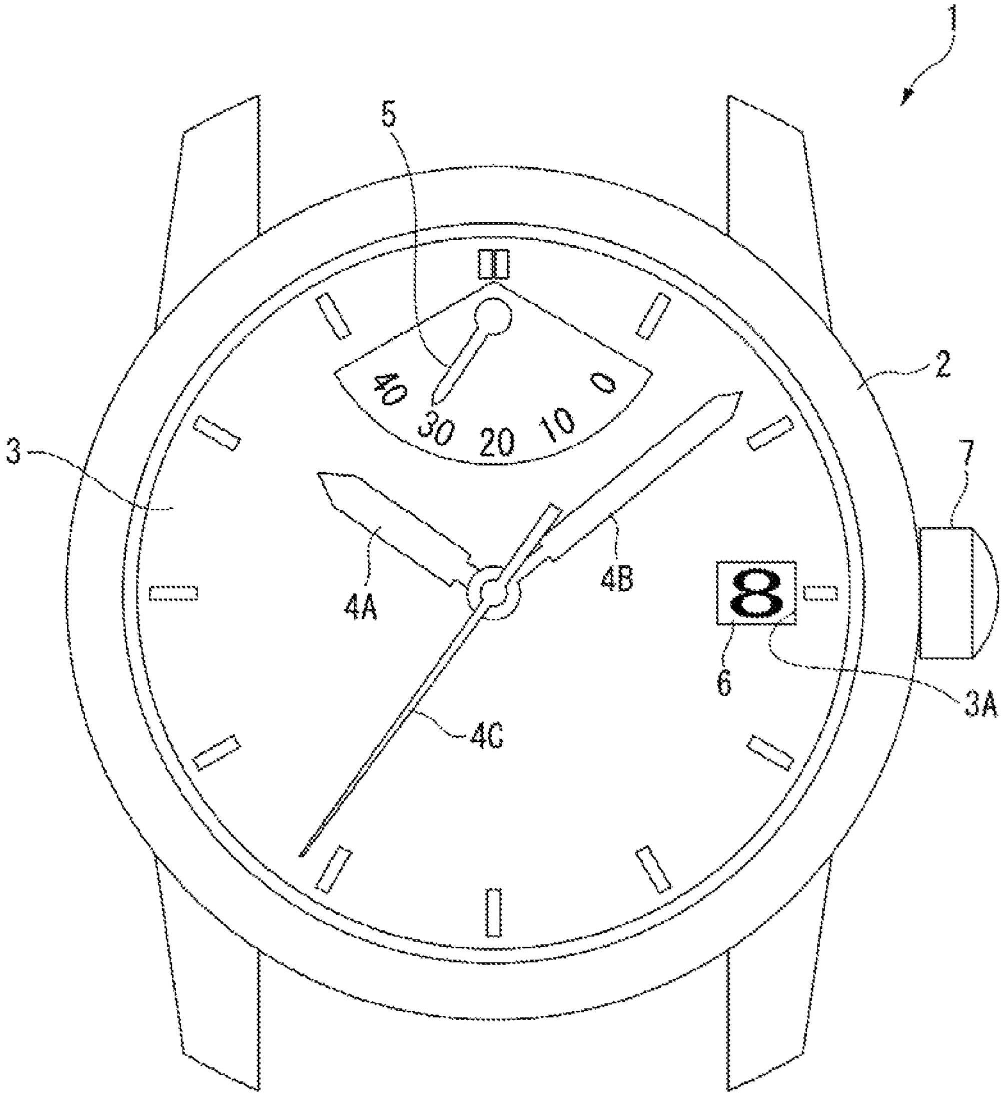
FIG. 1 is a plan view illustrating a configuration of a timepiece.

As illustrated in FIG. 1, the timepiece 1 is a mechanical wristwatch worn on the wrist of a user, and includes an outer case 2 having a cylindrical shape. A dial 3 is disposed at an inner peripheral side of the outer case 2. Of two openings of the outer case 2, the opening at the front surface side is closed by a cover glass, and the opening at the back surface side is closed by a case back.

The timepiece 1 includes, for example, a movement 10 (refer to FIG. 2) accommodated in the outer case 2, an hour hand 4A, a minute hand 4B, and a seconds hand 4C that display time information, and a power reserve hand 5 that indicates a duration time by a mainspring (not illustrated).

The hour hand 4A, the minute hand 4B, the seconds hand 4C, and the power reserve hand 5 are attached to a hand shaft of the movement 10, and are driven by the movement 10. The dial 3 is provided with a calendar small window 3A, and a date indicator 6 is visible through the calendar small window 3A. A crown 7 is provided on a side surface of the outer case 2.

Next, a configuration of the movement 10 will be described with reference to FIG. 2.

Figure 2:
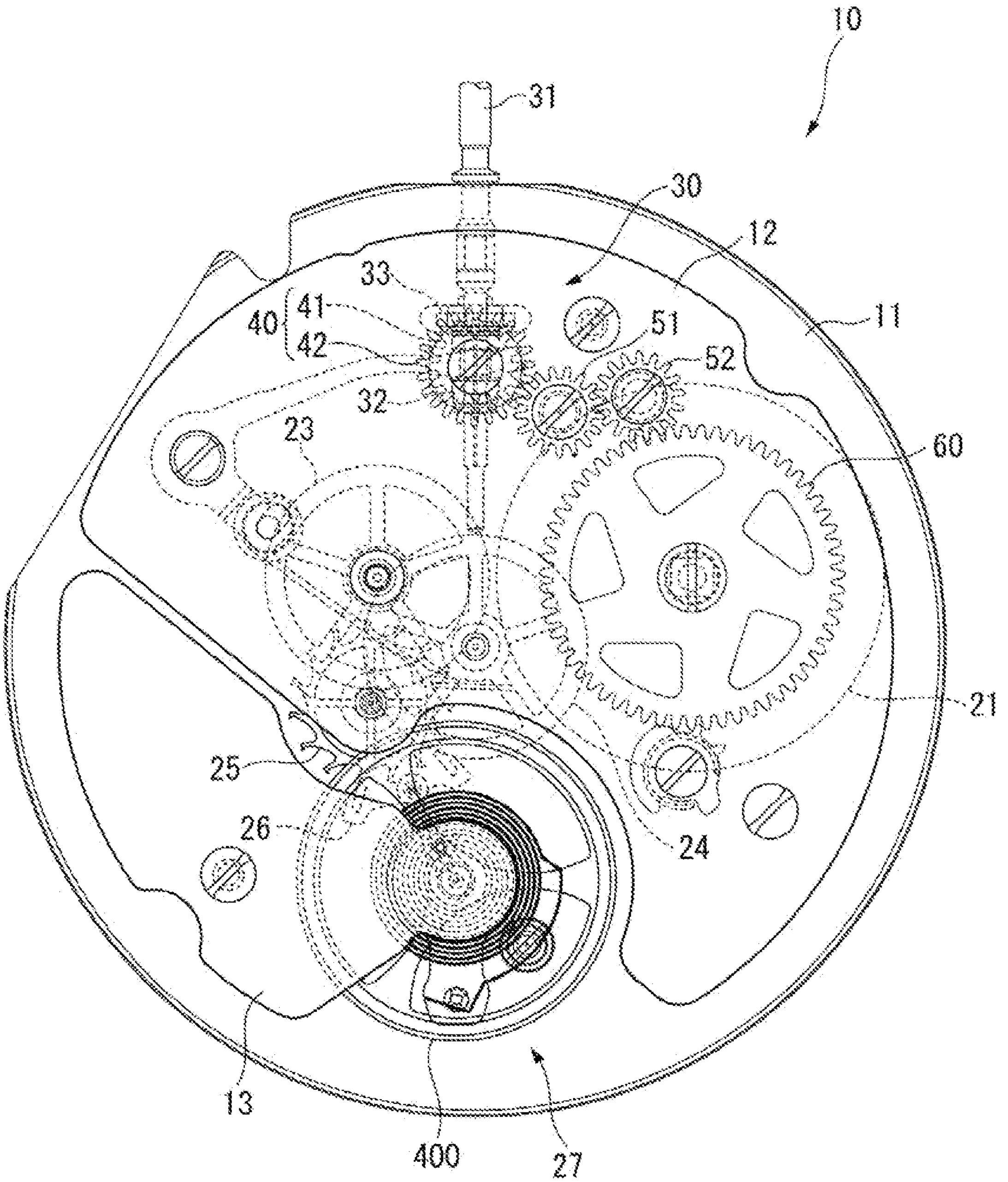
FIG. 2 is a plan view illustrating a configuration of a movement.

As illustrated in FIG. 2, the movement 10 includes a main plate 11, a barrel and train wheel bridge 12, and a balance bridge 13. A movement barrel complete 21 accommodating the mainspring, a center wheel and pinion (not illustrated), a third wheel and pinion 23, a fourth wheel and pinion 24, and an escape wheel 25 are disposed between the main plate 11 and the barrel and train wheel bridge 12. Additionally, a pallet fork 26, a speed governor 27, and the like are disposed between the main plate 11 and the balance bridge 13. Then, in the present embodiment, the speed governor 27 includes a balance 400.

The hand winding mechanism 30 includes a winding stem 31, a clutch wheel 32, a winding pinion 33, a crown wheel 40, a first intermediate wheel 51, and a second intermediate wheel 52 that are rotatably supported by the barrel and train wheel bridge 12. The hand winding mechanism 30 transmits a rotation due to a rotation operation of the crown 7 to a ratchet wheel 60, rotates the ratchet wheel 60 and a barrel arbor, and winds the mainspring. Note that the crown wheel 40 is constituted by a first crown wheel 41 that engages with the winding pinion 33, and a second crown wheel 42 that rotates integrally with the first crown wheel 41 and that engages with the first intermediate wheel 51.

Next, a configuration of the balance 400 will be described below with reference to FIG. 3 to FIG. 5.

Figure 3:
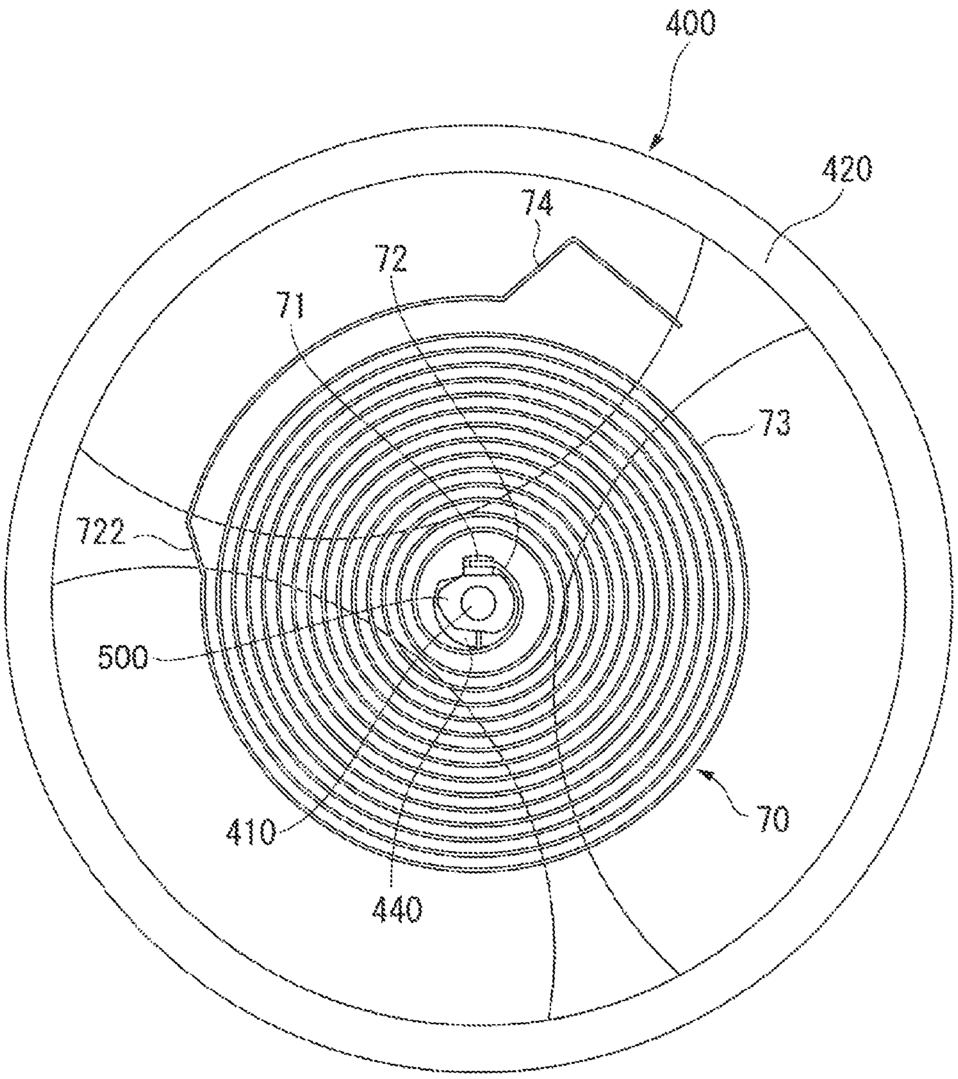
FIG. 3 is a plan view illustrating a configuration of a balance.
Figure 4:
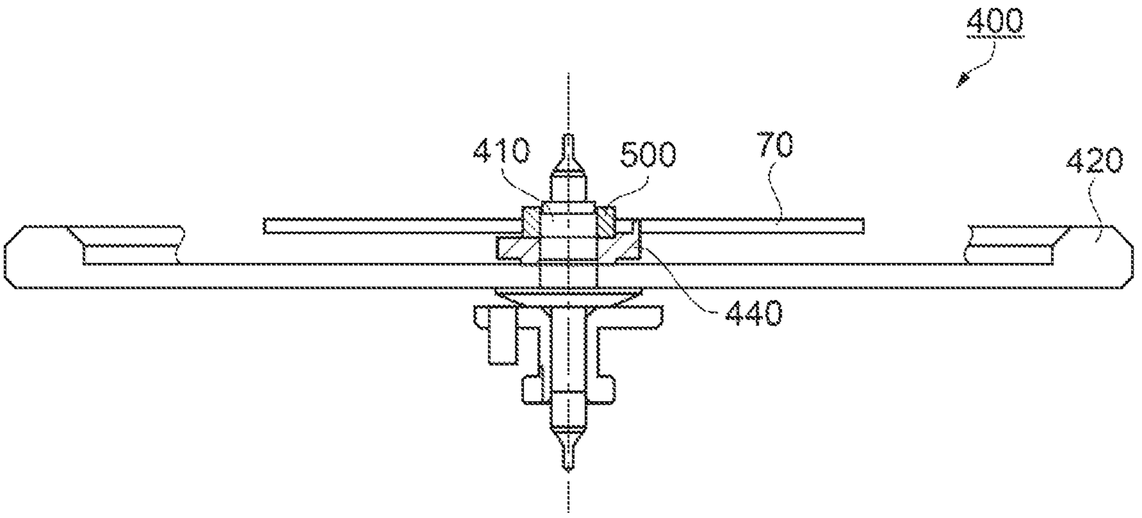
FIG. 4 is a cross-sectional view illustrating a configuration of the balance.

As illustrated in FIG. 3 and FIG. 4, the balance 400 includes a balance staff 410, a balance wheel 420, a collet 440, and a hairspring 70.

The balance staff 410 is rotatably supported by the main plate 11 and the balance bridge 13 (see FIG. 2). Note that the main plate 11 and the balance bridge 13 are examples of a supporting member.

The balance wheel 420, the collet 440, and the like are fixed to the balance staff 410 so as to integrally rotate. An inner end portion 71 (see FIG. 5) of the hairspring 70 is fixed to the collet 440, and an outer end portion 74 thereof is fixed to a stud (not illustrated). The stud is fixed to the balance bridge 13.

In the balance 400, when the balance wheel 420 rotates with the balance staff 410 as an axis, the collet 440 also rotates. A biasing force of the hairspring 70 acts on the balance wheel 420. When the biasing force and an inertial force of the balance wheel 420 are balanced with each other, the rotation of the balance wheel 420 stops, and the balance wheel 420 rotates in the reverse direction due to the biasing force of the hairspring 70. That is, the balance wheel 420 repeats swinging with the balance staff 410 as an axis.

Figure 5:
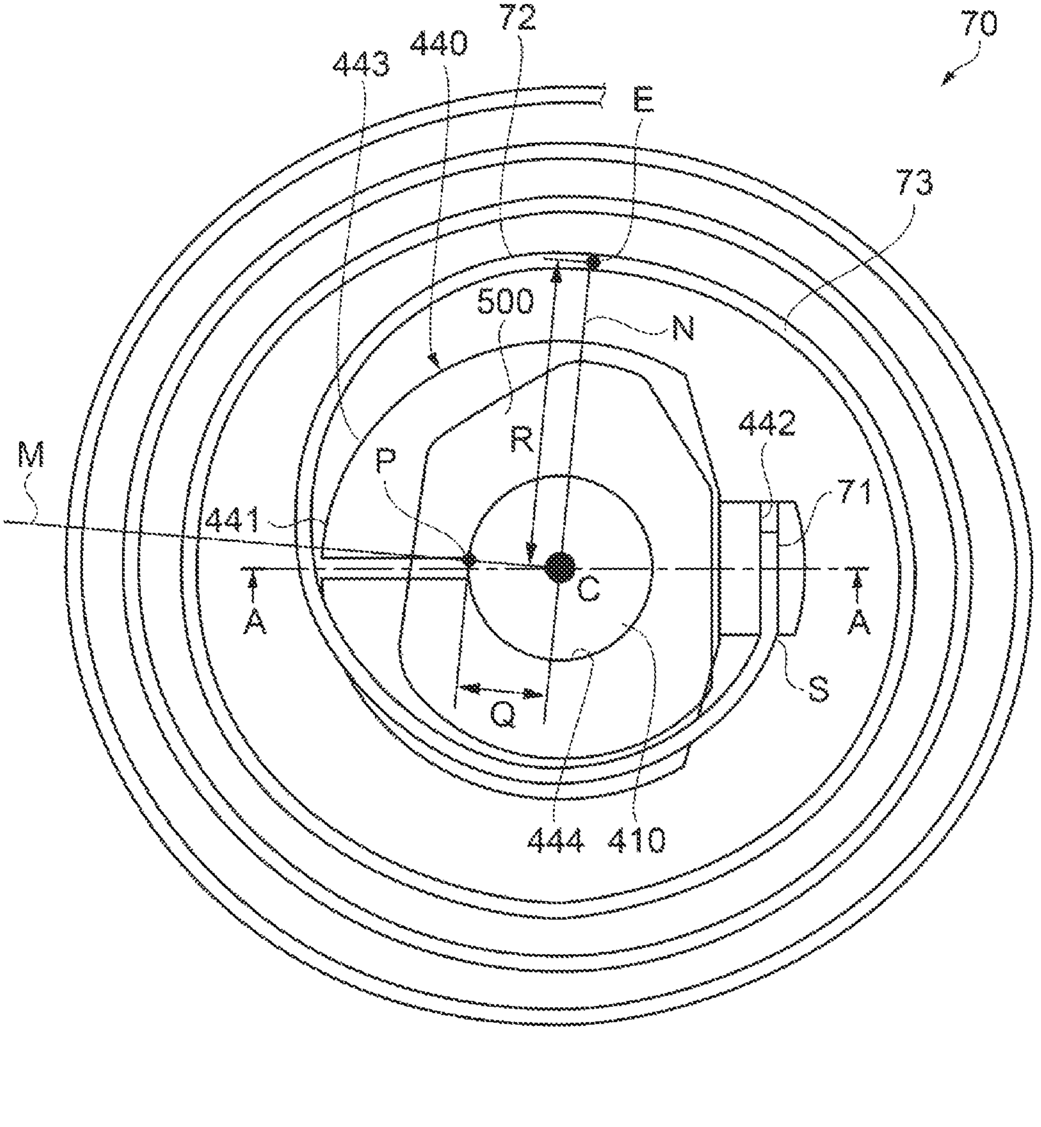
FIG. 5 is an enlarged plan view illustrating a configuration of a part of the balance.

As illustrated in FIG. 5, the hairspring 70 is formed of an elastic material made of metal and having a plate shape, specifically, an elastic material obtained by forming a Co-elinvar or the like in a plate shape, the Co-elinvar being an alloy containing Cr, Ni, Co, and the like. Note that the hairspring 70 may be made of a silicon material. The hairspring 70 includes an inner end portion 71, a first winding portion 72, a second winding portion 73, and an outer end portion 74.

The inner end portion 71 is a portion inserted into and fixed to a fixing portion 442 of the collet 440. The first winding portion 72 is formed continuously from the inner end portion 71. The first winding portion 72 is formed along a Grossmann curve in plan view seen from the axial direction of the balance staff 410.

Specifically, in FIG. 5, the first winding portion 72 is formed such that the center of gravity is positioned at an imaginary point P that is on an imaginary line segment M orthogonal to an imaginary line segment N coupling a coupling point E of the first winding portion 72 and the second winding portion 73 and a center point C of the balance staff 410, and where a length Q from the center point C of the balance staff 410 satisfies the following Equation (1).

$$Q=R^2/L \qquad \text{Equation (1)}$$

Note that in the above Equation (1), R is a length of the imaginary line segment N from the center point C of the balance staff 410 to the coupling point E of the first winding portion 72 and the second winding portion 73. In addition, L is a length of an arc from a coupling point S of the inner end portion 71 and the first winding portion 72 to the coupling point E of the first winding portion 72 and the second winding portion 73, that is, a length of the first winding portion 72.

The second winding portion 73 is formed continuously from the first winding portion 72. The second winding portion 73 is formed along an Archimedes curve in plan view seen from the axial direction of the balance staff 410. In the present embodiment, a bent portion 722 (see FIG. 3) is formed in the middle of the outermost periphery of the second winding portion 73.

The outer end portion 74 (see FIG. 3) is formed continuously from the second winding portion 73 and is fixed to the stud (not illustrated). That is, in the hairspring 70, the inner end portion 71 is fixed to the collet 440, and the outer end portion 74 is fixed to the stud (not illustrated).

Next, configurations of the collet 440, the hairspring 70, and an impact-resistant member 500 will be described with reference to FIG. 6 and FIG. 7.

Figure 6:
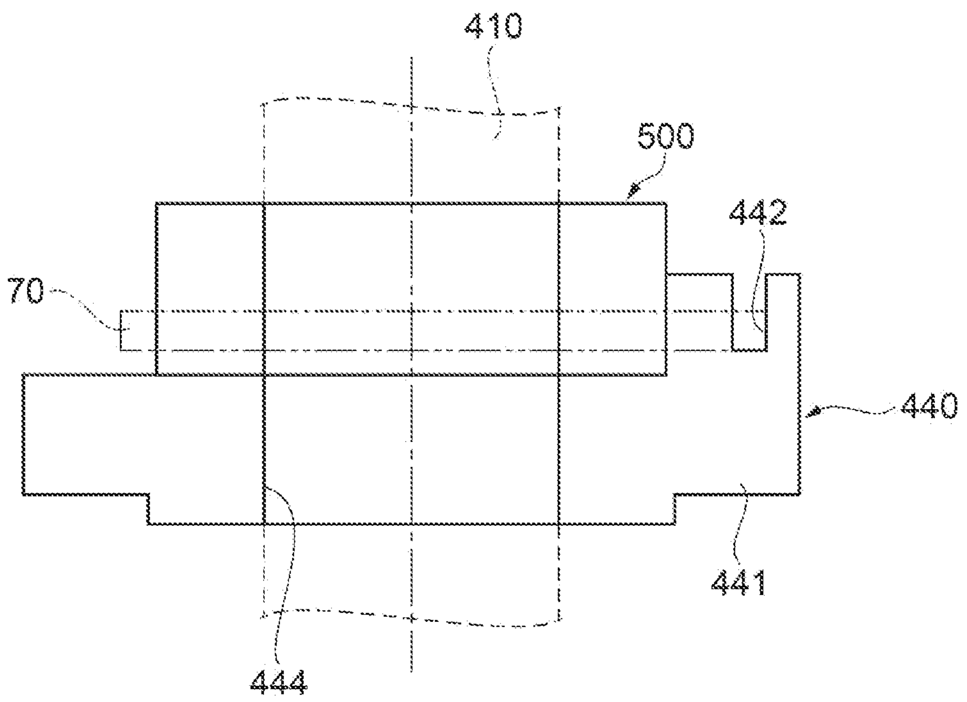
FIG. 6 is a cross-sectional view illustrating configurations of a collet and an impact-resistant member.
Figure 7:
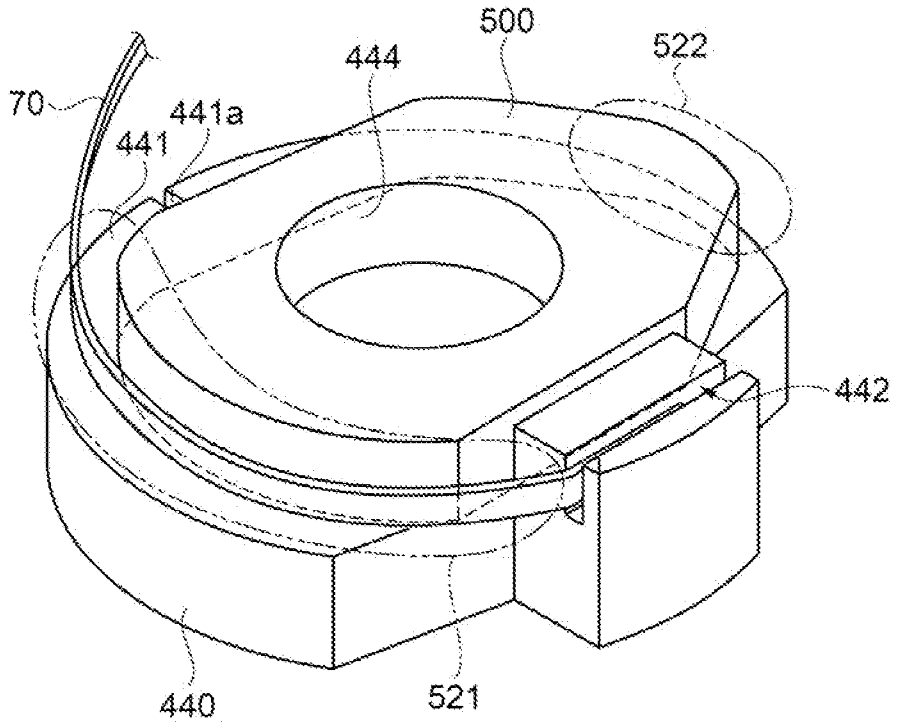
FIG. 7 is a perspective view illustrating configurations of the collet, a hairspring, and the impact-resistant member.

As illustrated in FIG. 6 and FIG. 7, the collet 440 is fixed to the balance staff 410. On the collet 440, the impact-resistant member 500 is disposed fixed to the balance staff 410.

The collet 440 includes, for example, a collet body 441, the fixing portion 442, and a balance staff insertion hole 444.

The collet body 441 is provided in a substantially cylindrical shape having an outer shape 443 having a substantially circular shape (see FIG. 5).

The collet body 441 is formed with a dividing portion 441*a* (see FIG. 7) by which a part of the collet body 441 is divided. Thus, when the balance staff 410 is inserted into the balance staff insertion hole 444, and a torque when the collet 440 is fixed to the balance staff 410 is too strong, the torque can be adjusted to an appropriate value by widening the dividing portion 441*a*.

The fixing portion 442 includes a groove, and is a portion that fixes the inner end portion 71 of the hairspring 70. The fixing portion 442 fixes the hairspring 70 by sandwiching the inner end portion 71 in the groove.

The balance staff insertion hole 444 is an insertion hole into which the balance staff 410 is inserted.

As described above, the impact-resistant member 500 is disposed on the collet 440. The impact-resistant member 500 is used to suppress displacement of the Grossmann curve that is the first winding portion 72 of the hairspring 70. The impact-resistant member 500 is made of a metal material having a substantially cylindrical shape.

The impact-resistant member 500 supports the hairspring 70 so as to maintain the Grossmann curve at least at or near a first region 521 at the inner end portion 71 side and a second region 522 that is a boundary between the first winding portion 72 and the second winding portion 73.

As illustrated in FIG. 7, the first region 521 is near the fixing portion 442 that fixes the hairspring 70 to the collet 440. The second region 522 is, for example, within a range from about 180° to about 360° when a portion changing from the Grossmann curve to the Archimedes curve is at a position about 270° from the fixing portion 442. Note that the impact-resistant member 500 may support the range from the first region 521 to the second region 522, and a shape of each portion is set so as to achieve both the prevention of deformation of the hairspring 70 and the balance of the center of gravity of the impact-resistant member 500.

That is, in the range in which the displacement of the hairspring 70 is suppressed by the impact-resistant member 500, the distance between the impact-resistant member 500 and the hairspring 70 is shorter than in the other regions. Specifically, the outer peripheral shape of a region other than the first region 521 and the second region 522 in the impact-resistant member 500 does not need to be a circular shape, but may be a deformed shape. For example, the outer peripheral shape may be dented or cut out. Additionally, when the outer peripheral shape is a circular shape, there may be a hollow region.

Specifically, for example, an arc having a length L of 750 μm to 1000 μm from the coupling point S of the inner end portion 71 and the first winding portion 72 is set to have a gap of 50 μm or less. Setting such a gap can suppress deformation of a root portion of the hairspring 70 to the inner side. In addition, at the side facing the coupling point S, the gap is set to be within a range from 200 μm to 250 μm. Setting such a gap can suppress the deformation of the root portion of the hairspring 70 to the outer side.

In addition, in a region between the first region 521 and the second region 522, the gap with the hairspring 70 is set so as to suppress the deformation of the root portion of the hairspring 70 while providing a cut-out portion such that the center of gravity of the impact-resistant member 500 coincides with the center of the balance staff. According to this configuration, deformation of the Grossmann curve when an impact is applied to the hairspring 70 from any direction can be suppressed. In addition, the occurrence of a lopsided weight due to the impact-resistant member 500 can be suppressed.

In addition, the height of the impact-resistant member 500 is provided so as to be at least equal to or higher than the height of the hairspring 70. According to this configuration, the displacement of the hairspring 70 is suppressed by the impact-resistant member 500 having a height equal to or higher than the height of the hairspring 70, and thus, when an impact is applied to the hairspring 70, the deformation of the Grossmann curve can be suppressed.

Next, a method for manufacturing the balance 400 will be described with reference to FIG. 8 to FIG. 11.

Figure 8:
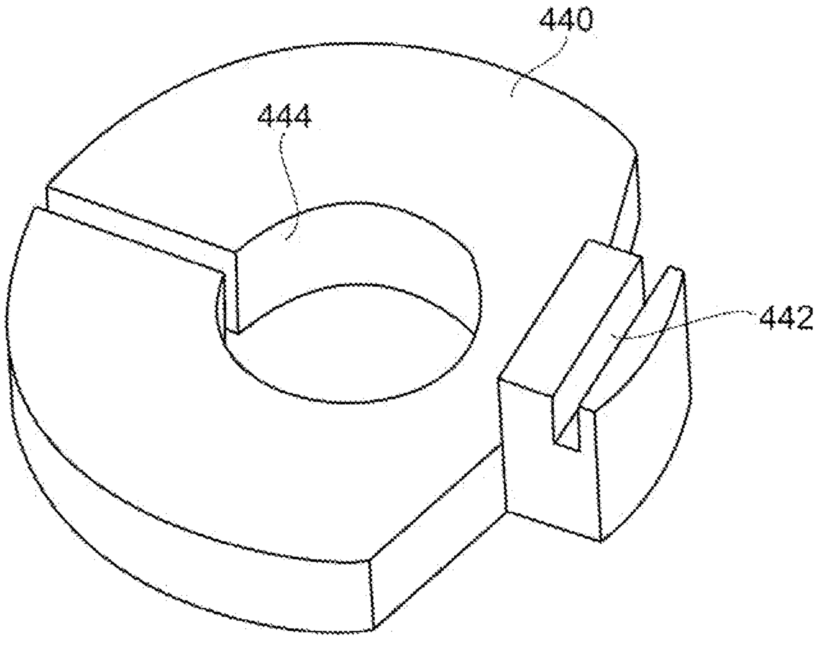
FIG. 8 is a perspective view illustrating a method for manufacturing a balance.

In the step illustrated in FIG. 8, the hairspring 70 (see FIG. 9) and the collet 440 are prepared. Specifically, a hairspring member formed of an elastic material made of metal and having a plate shape is formed along an Archimedes curve.

Figure 9:
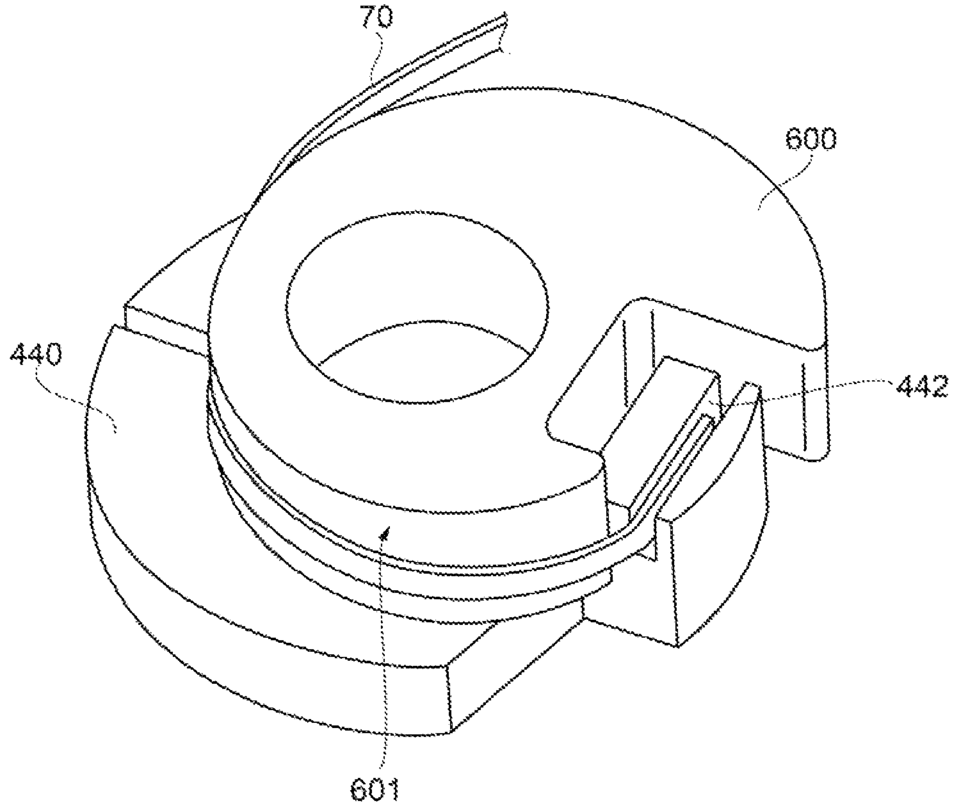
FIG. 9 is a perspective view illustrating the method for manufacturing the balance.

In the step illustrated in FIG. 9, by using a shaping member 600, shaping is performed so that the section from the coupling point S to the coupling point E of the hairspring 70 becomes a Grossmann curve. Specifically, first, the inner end portion 71 of the hairspring 70 is fixed to the fixing portion 442 of the collet 440. Thereafter, the inner end section of the hairspring 70 is shaped so as to form the Grossmann curve along the outer peripheral shape portion 601 of the shaping member 600.

Figure 10:
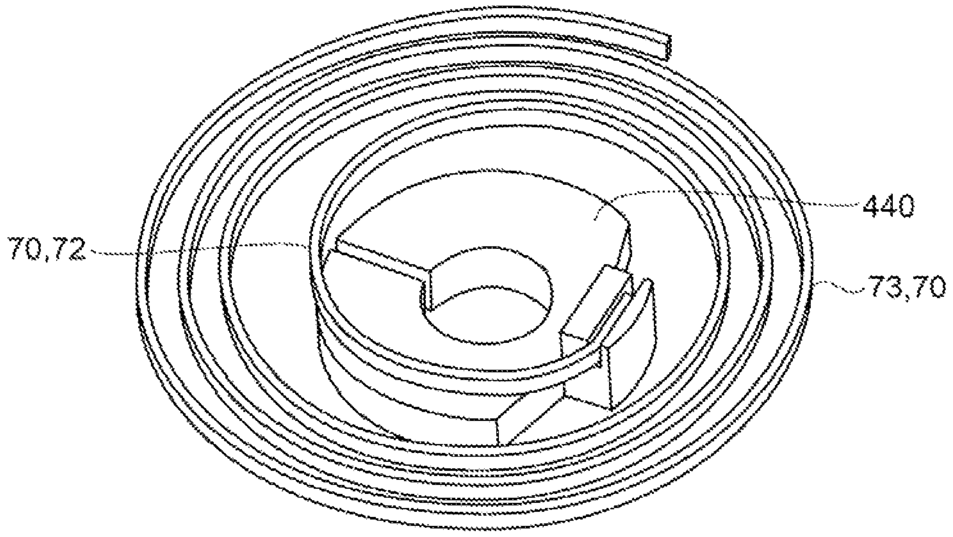
FIG. 10 is a perspective view illustrating the method for manufacturing the balance.

In the step illustrated in FIG. 10, the shaping member 600 is removed from the collet 440. Thus, the hairspring 70 including the first winding portion 72 formed along the Grossmann curve and the second winding portion 73 formed along the Archimedes curve is formed.

Figure 11:
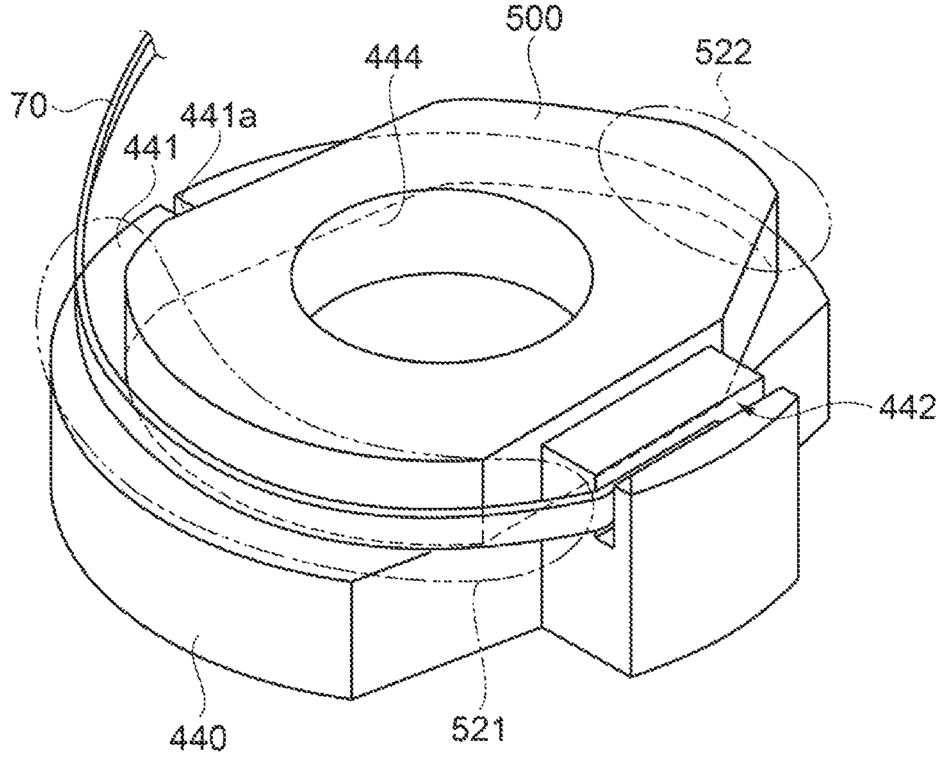
FIG. 11 is a perspective view illustrating the method for manufacturing the balance.

In the step illustrated in FIG. 11, the balance 400 is completed by fixing the collet 440 to which the hairspring 70 is fixed and the balance wheel 420 to the balance staff 410, and then, fixing the impact-resistant member 500 that suppresses displacement of the first winding portion 72 of the hairspring 70, to the balance staff on the collet 440. Accordingly, when an impact is applied to the hairspring 70, deformation of the Grossmann curve fixed to the collet 440 and particularly susceptible to impact can be suppressed.

As described above, the balance 400 according to the present embodiment includes the balance staff 410 rotatably supported by the main plate 11 and the balance bridge 13, the collet 440 fixed to the balance staff 410, the hairspring 70 fixed to the collet 440 and including the Grossmann curve disposed at the side of the collet 440 and the Archimedes curve coupled to the Grossmann curve, and the impact-resistant member 500 configured to suppress displacement of the shape of the Grossmann curve at least at the side of the collet 440.

According to this configuration, the displacement of the shape of the Grossmann curve at least at the side of the collet 440 is suppressed by the impact-resistant member 500. For example, when an impact is applied to the hairspring 70, the deformation of the Grossmann curve fixed to the collet 440 and particularly susceptible to impact can be suppressed. As a result, the influence on the accuracy of the speed governing of the balance 400, in other words, the accuracy of the timepiece 1 can be suppressed.

In addition, in the balance 400 according to the present embodiment, the center of gravity of a combination of the collet and the impact-resistant member may coincide with the substantial center of the balance staff. According to this configuration, the center of gravity coincides with the center of the balance staff, and thus, the occurrence of a lopsided weight due to the deviation of the center of gravity can be suppressed.

In addition, in the balance 400 according to the present embodiment, the distance between the impact-resistant member 500 and the hairspring 70 may be set to be smaller at or near the first region 521 where the hairspring 70 is fixed to the collet 440 and the second region 522 where the Grossmann curve changes to the Archimedes curve than that between the first region 521 and the second region 522. According to this configuration, at least in the first region 521 and the second region 522, the distance between the impact-resistant member 500 and the hairspring 70 is small, and the displacement of the hairspring 70 can be suppressed. Thus, when an impact is applied to the hairspring 70, deformation of the Grossmann curve can be suppressed.

In addition, in the balance 400 according to the present embodiment, the impact-resistant member 500 may have a cut-out shape or a dented shape between the first region 521 and the second region 522. According to this configuration, the deformation of the Grossmann curve when an impact is applied to the hairspring 70 can be suppressed, and the occurrence of a lopsided weight due to the impact-resistant member 500 can be suppressed.

In addition, in the balance 400 according to the present embodiment, the height of the impact-resistant member 500 may be at least equal to or larger than the height of the hairspring 70. According to this configuration, the displacement of the hairspring 70 is suppressed by the impact-resistant member 500 having a height equal to or larger than the height of the hairspring 70, and thus, when an impact is applied to the hairspring 70, the deformation of the Grossmann curve can be suppressed.

Additionally, the timepiece 1 according to the present embodiment includes the balance 400 described above. According to this configuration, since the balance 400 is included, the deformation of the hairspring 70 can be suppressed even when an impact is applied to the timepiece 1. Thus, the timepiece 1 capable of suppressing the influence on the accuracy of time can be provided.

In addition, the method for manufacturing the balance 400 according to the present embodiment includes preparing the hairspring 70 along the Archimedes curve, fixing the inner end portion 71 of the hairspring 70 to the collet 440, and shaping the inner end section of the hairspring 70 into the Grossmann curve by using the shaping member 600. According to this method, the hairspring 70 is shaped so as to have the Grossmann curve, and thus, the accuracy of speed governing of the balance 400 can be improved.

In addition, the method for manufacturing the balance 400 according to the present embodiment may include attaching the impact-resistant member 500 configured to suppress displacement of the Grossmann curve, to the balance staff 410. According to this method, the impact-resistant member 500 is attached after the shaping member 600 is detached, for example, and thus, when an impact is applied to the hairspring 70, deformation of the Grossmann curve of the hairspring 70 fixed to the collet 440 and particularly susceptible to impact can be suppressed. As a result, an influence on the accuracy of speed governing of the balance 400 can be suppressed.

Modified examples of the embodiment described above will be described below.

As described above, the present disclosure is not limited to the case where the impact-resistant member 500 is attached after the shaping member 600 is detached from the collet 440, and the following method may be employed.

Figure 12:
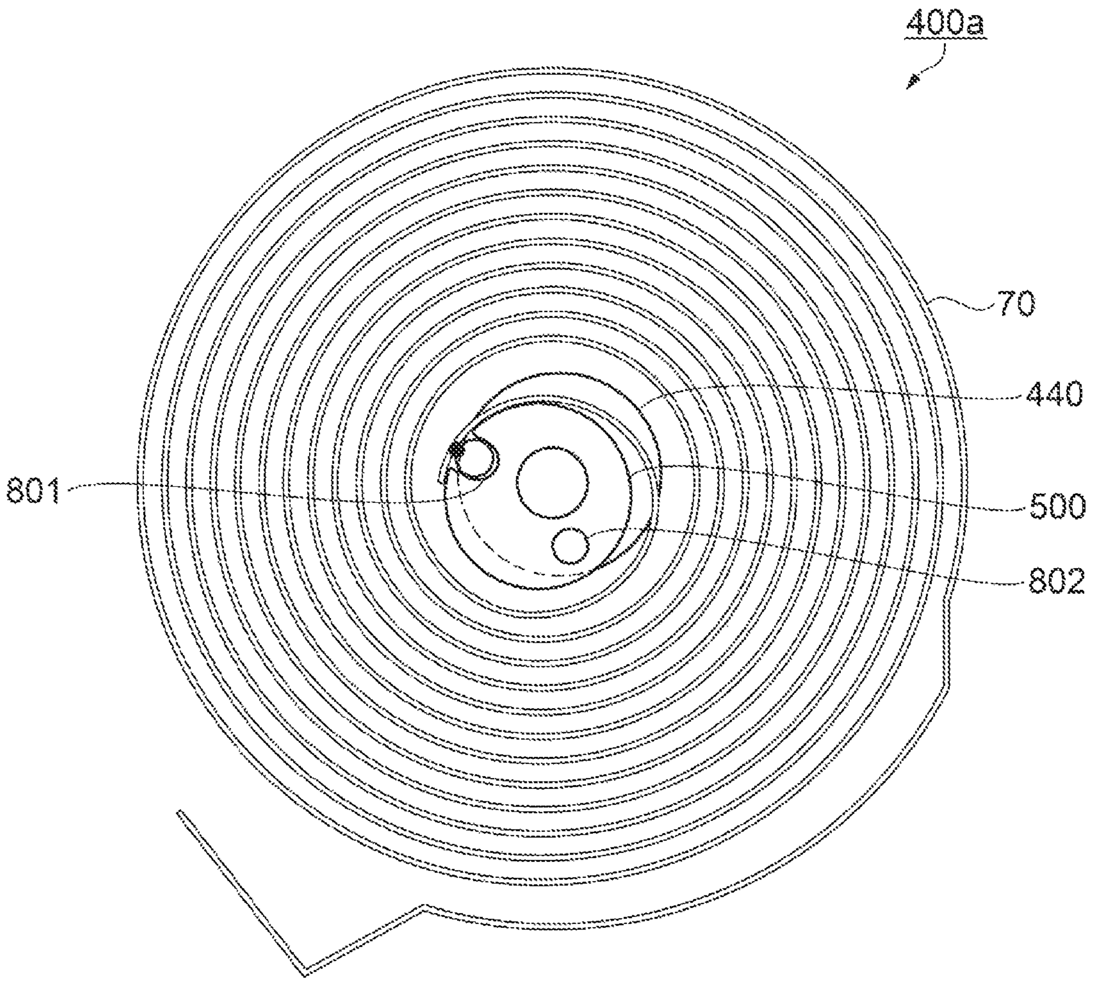
FIG. 12 is a plan view illustrating a configuration of a balance according to a modified example.
Figure 13:
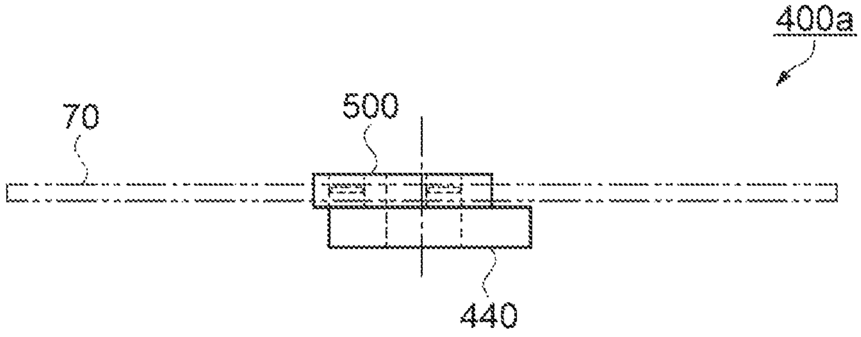
FIG. 13 is a cross-sectional view illustrating the configuration of the balance according to the modified example.

As illustrated in FIG. 12 and FIG. 13, in a balance 400*a* according to Modified Example 1, the impact-resistant member 500 may also function as the shaping member 600. As a method for manufacturing the balance 400*a* according to Modified Example 1, first, the inner end portion 71 of the hairspring 70 formed in the Archimedes curve is fixed to the side surface of one fitting portion 801 of two fitting portions 801 and 802 provided in the collet 440 by, for example, laser welding or the like. Next, the impact-resistant member 500 having a function of the above-described shaping member 600 is attached to the collet 440. At this time, positioning and fixing with respect to the collet 440 are performed by the fitting portions 801 and 802. The hairspring 70 is shaped by using the impact-resistant member 500 to form a Grossmann curve. Thereafter, the collet 440 and the impact-resistant member 500 are attached to the balance staff 410.

As described above, the method for manufacturing the balance 400*a* according to Modified Example 1 includes preparing the hairspring 70 along the Archimedes curve, fixing the inner end portion 71 of the hairspring 70 to the collet 440, attaching the impact-resistant member 500 to the collet 440, and shaping the inner end section of the hairspring 70 into the Grossmann curve by using the impact-resistant member 500.

According to this method, the hairspring 70 can be shaped by using the impact-resistant member 500. Thus, when an impact is applied to the hairspring 70 due to dropping or the like in use after manufacturing, deformation of the Grossmann curve can be suppressed by using the impact-resistant member 500 that also functions as a part of the balance as is while performing shaping. As a result, the influence on the accuracy of speed governing of the balance 400*a* can be suppressed.

In a balance 400*b* according to Modified Example 2, the impact-resistant member 500 and the collet 440 are integrated with each other. In other words, the collet 440 has a function of the impact-resistant member 500 and a function of the shaping member 600.

Figure 14:
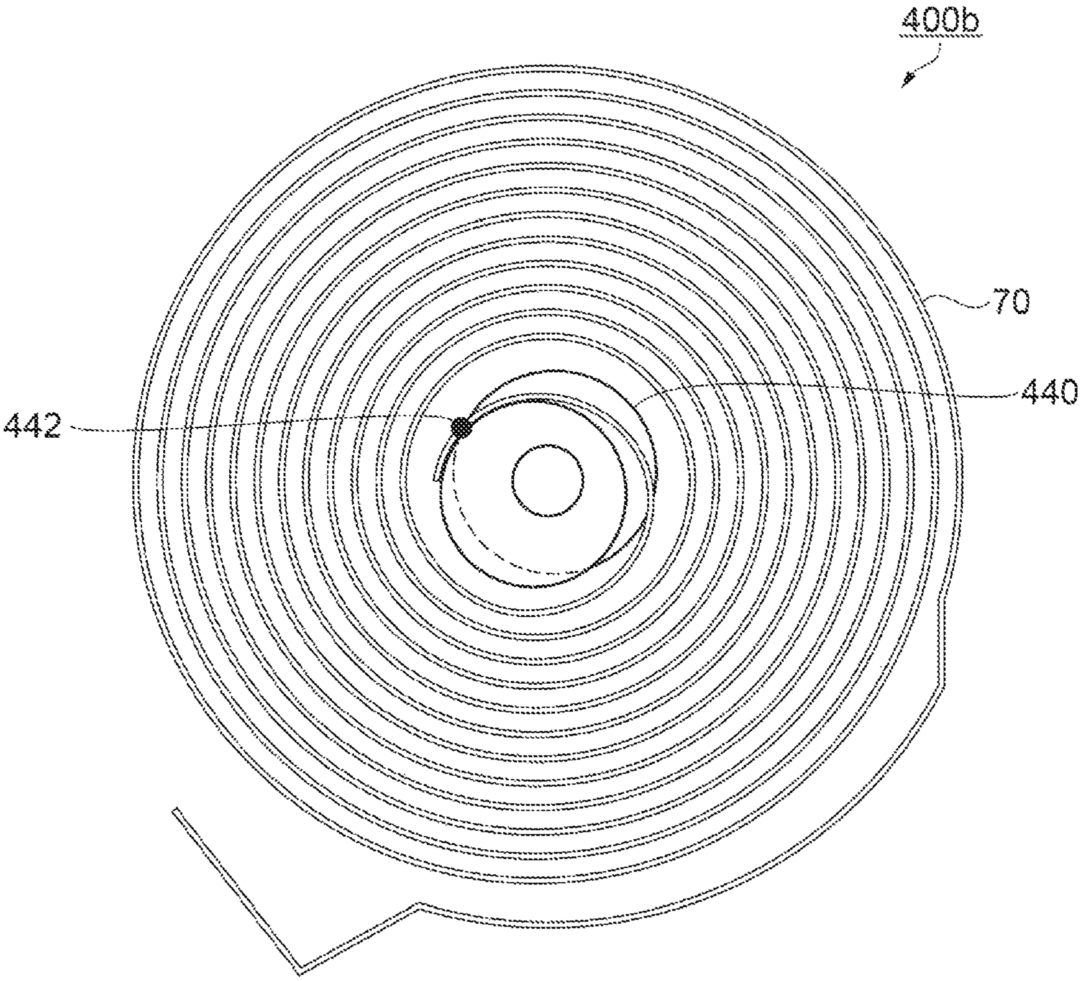
FIG. 14 is a plan view illustrating a configuration of a balance according to a modified example.
Figure 15:
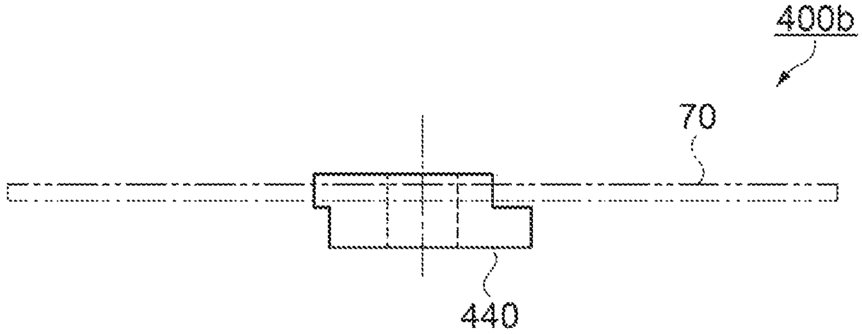
FIG. 15 is a cross-sectional view illustrating the configuration of the balance according to the modified example.

As illustrated in FIG. 14 and FIG. 15, in the method for manufacturing the balance 400*b* according to Modified Example 2, first, the collet 440 in which the impact-resistant member 500 having the function of the shaping member 600 described above and the function of the collet 440 are integrated with each other is prepared. The collet is constituted by two layers of a lower layer having a function of a center-of-gravity adjustment member and an upper layer having functions of the impact-resistant member 500 and the shaping member 600. Next, the inner end portion 71 of the hairspring 70 formed in the Archimedes curve is fixed to the fixing portion 442 of the upper layer of the collet 440 by, for example, laser welding. Next, the hairspring 70 is shaped by using the collet 440 to form a Grossmann curve. Thereafter, the collet 440 is attached to the balance staff.

As described above, in the balance 400*b* according to Modified Example 2, the impact-resistant member 500 may be integrated with the collet 440. According to this configuration, the impact-resistant member 500 and the collet 440 are integrated with each other, and thus, an increase in the number of components can be prevented.

Further, the method for manufacturing the balance 400*b* according to Modified Example 2 includes preparing the hairspring 70 along the Archimedes curve, fixing the inner end portion 71 of the hairspring 70 to the collet 440, and shaping the inner end section of the hairspring 70 into the Grossmann curve by using the collet 440.

According to this method, the hairspring 70 can be shaped by using the collet 440. Thus, when an impact is applied to the hairspring 70 due to a drop or the like in use after manufacturing, deformation of the Grossmann curve can be suppressed by using the collet 440 that also functions as an impact-resistant member as is while performing shaping, and an influence on the accuracy of speed governing of the balance 400*b* can be suppressed.

Further, as described above, the impact-resistant member 500 is not limited to being fixed to the balance staff 410, and may be fixed to the collet 440.

Further, the impact-resistant member 500 is not limited to being made of a metal material, but may be made of a resin material. According to this, since the specific gravity is small, the occurrence of a lopsided weight in the balance 400 can be further suppressed even when variation in shape occurs.

Additionally, the collet 440 may include a center-of-gravity adjustment member configured to adjust the center of gravity of a combination of the collet 440 and the impact-resistant member 500 to the center position of the balance staff 410. Thus, a decrease in accuracy of the timepiece 1 can be suppressed due to the occurrence of a lopsided weight in the balance 400.

As described above, the balance 400 according to the modified example may include the center-of-gravity adjustment member configured to adjust the center of gravity of the combination of the collet 440 and the impact-resistant member 500 to the center position of the balance staff 410.

In addition, in the balance 400 of the modified example, the center-of-gravity adjustment member may be integrated with the collet 440. According to this configuration, since the center-of-gravity adjustment member and the collet are integrated with each other, an increase in the number of components can be prevented.

In addition, as described above, the center-of-gravity adjustment member is not limited to being provided in the collet 440, and the center-of-gravity adjustment member may be provided in the impact-resistant member 500. Further, the center-of-gravity adjustment member may be provided such that the impact-resistant member 500 alone coincides with the center point of the balance staff 410, and the center-of-gravity adjustment member may be provided such that the collet 440 alone coincides with the center point of the balance staff 410.

What is claimed is:

1. A balance comprising:
a balance staff rotatably supported by a supporting member;
a collet fixed to the balance staff;
a hairspring fixed to the collet, the hairspring including a Grossmann curve disposed at a side of the collet and an Archimedes curve coupled to the Grossmann curve; and
an impact-resistant member disposed on a top surface of the collet, the impact-resistant member being non-circular shaped in a plan view, the impact-resistant member being configured to suppress displacement of a shape of the Grossmann curve at least at the side of the collet.

2. The balance according to claim 1, wherein
a center of gravity of a combination of the collet and the impact-resistant member coincides with a substantial center of the balance staff.

3. The balance according to claim 1, further comprising:
a center-of-gravity adjustment member configured to adjust a center of gravity of a combination of the collet and the impact-resistant member to a center position of the balance staff.

4. The balance according to claim 1, wherein
the hairspring has a first region that is fixed to the collet, a second region in which a curve of the hairspring changes between the Grossmann curve and the Archimedes curve, and a third region between the first and second regions, and
each of a distance between the first region and a first closest outer periphery of the impact-resistant member in the plan view and a distance between the second region and a second closest outer periphery of the impact-resistant member in the plan view is smaller than a distance between the third region and a third closest outer periphery of the impact-resistant member in the plan view.

5. The balance according to claim 4, wherein
the impact-resistant member has a cut-out shape or a non-circular shape at the third region in the plan view.

6. The balance according to claim 1, wherein
a height of the impact-resistant member is at least equal to or larger than a height of the hairspring.

7. The balance according to claim 1, wherein
the impact-resistant member is integrated with the collet.

8. The balance according to claim 3, wherein
the center-of-gravity adjustment member is integrated with the collet.

9. A timepiece comprising:
the balance according to claim 1.

10. A method for manufacturing a balance, the balance including:
a balance staff rotatably supported by a supporting member and
a collet fixed to the balance staff,
the method comprising:
preparing a hairspring along an Archimedes curve;
fixing an inner end portion of the hairspring to the collet;
shaping an inner end section of the hairspring into a Grossmann curve by using a shaping member;
removing the shaping member from the collet; and
attaching an impact-resistant member, which is configured to suppress displacement of the Grossmann curve, to the balance staff,
wherein the impact-resistant member is disposed on a top surface of the collet, and the impact-resistant member is non-circular shaped in a plan view.

11. A method for manufacturing a balance, the balance including:
a balance staff rotatably supported by a supporting member and
a collet fixed to the balance staff,
the method comprising:
preparing a hairspring along an Archimedes curve;
fixing an inner end portion of the hairspring to the collet;
attaching an impact-resistant member to the collet; and
shaping an inner end section of the hairspring into a Grossmann curve by using the impact-resistant member.

12. A method for manufacturing a balance, the balance including:
a balance staff rotatably supported by a supporting member and
a collet fixed to the balance staff,
the method comprising:
preparing a hairspring along an Archimedes curve;
fixing an inner end portion of the hairspring to the collet; and
shaping an inner end section of the hairspring into a Grossmann curve by using the collet.

* * * * *